March 13, 1928.  1,662,374

C. G. WOODMANSEE

ORIFICE VALVE

Filed Dec. 21, 1925

INVENTOR.
Clay G. Woodmansee
BY Nestall and Wallace
ATTORNEYS.

Patented Mar. 13, 1928.

1,662,374

UNITED STATES PATENT OFFICE.

CLAY G. WOODMANSEE, OF LOS ANGELES, CALIFORNIA.

ORIFICE VALVE.

Application filed December 21, 1925. Serial No. 76,658.

This invention relates to an orifice valve adapted for use in the measurement of the flow of fluids but not limited to such use. It appertains especially to a valve having interchangeable orifice carriers, such as disks.

Such valves are employed in such manner and in such locations, that change of the orifice is frequently required. It is desirable to be able to make changes without shutting off the flow of fluid during the change, without taking down the valve, and in a minimum of time. It is the primary object of this invention to provide a valve of the character described which has an orifice carrier arranged so that it may quickly and readily be removed and replaced. Another object of this invention is to provide a valve of the character described having means to hold and lock the orifice carrier in position. In addition to the broader objects of this invention, there are certain details of structure, whereby a compact, economical and easily manipulated valve is obtained.

Figure 1:
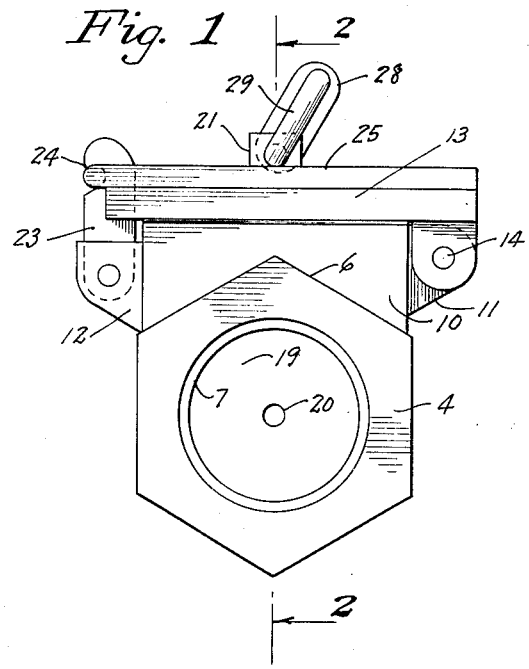
Figure 2:
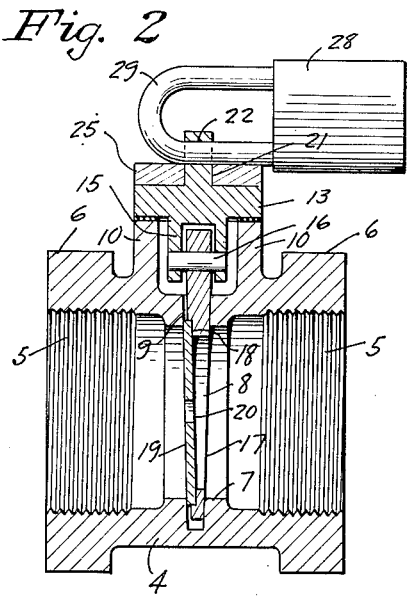
Figure 3:
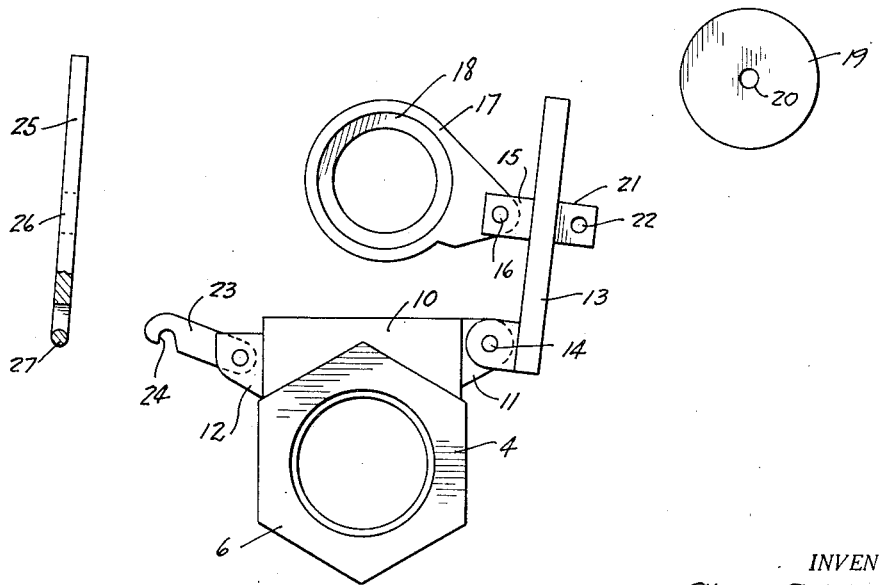

These objects together with other objects and corresponding accomplishments are obtained by means of the embodiment of my invention illustrated in the accompanying drawing, in which:

Fig. 1 is an end view of a valve with the orifice carrier in position; Fig. 2 is a section as seen on the line 2—2 of Fig. 1; and Fig. 3 is an end view showing the elements of the valve disassembled.

The valve comprises a body 4 of tubular form. It is shown internally threaded at the ends as indicated by 5 to provide for connection in a line through which fluid is to flow, but any other means of connection to the line may be used. Wrench holds 6 of hexagonal form are provided at the ends of the body for convenience in installing the valve. The body is shown with an internal constricted portion 7 having a groove 8 to form a seat for the disk cage. The groove 8 opens through a slot in the top of the body as indicated by 9 so as to permit the insertion and removal of the cage. The groove is tapered from the upper to the lower portion thereof as best shown in Fig. 2. Disposed on opposite sides of the opening 9 are bracket members 10 having ears 11 at one side for pivotal attachment thereto of an arm, and ears 12 at the opposite side for attachment thereto of a catch.

An arm 13 is secured by a pivot pin 14 between the ears 11 and has depending from the lower side thereof a pair of ears 15. The ears 15 are arranged to be received within a recess formed between brackets 10. Secured by a pivot pin 16 extending between ears 15 is an orifice cage 17. The orifice cage has a circular opening therein counterbored as indicated by 18 to form a depressed seat to receive an orifice disk 19. The orifice disk has extending therethrough an orifice 20 of the desired dimension. A set of disks having orifices of various sizes is provided so that disks may be interchangeably mounted in the cage. It will be noted that the disk 19 sets out from the face of the cage, the construction being such that when the assembled disk and cage are forced downwardly into the tapered recess, the disk will be wedged against cage to provide a tight fit. Upstanding from the arm 13 is a lug 21 having a hole 22 extending therethrough. Pivotally secured between the ears 12 by means of a pin is a catch 23 having a hook opening 24.

A hasp bar 25 has an opening 26 to receive the lug 21 and a keeper 27 at the end thereof to engage the hook 24 of the catch. A padlock 28 is arranged so that its hasp 29 may be passed through the opening 22 in the lug for locking the valve with the orifice in closed position. The hasp bar 25 is removable so that it may be conveniently used as a lever to pry the various elements open to permit removal and replacement of the orifice disk.

In Fig. 3 the valve is shown in open position. The desired orifice disk 19 is selected and slipped into position in the cage 17. The assembled cage and disk are then inserted through the slot 9 and forced downwardly into position in groove 8, thereby wedging the disk into its seat and closing the two chambers of the valve body from one another except through the orifice. The hasp bar 25 is then hooked under the catch 23 and moved into position over the arm 13 as shown in Fig. 1. The padlock is next placed in position with its hasp 29 extending through the opening 22 and locking the parts together. To remove the orifice disk the steps just described are followed in reversed order.

It is obvious that a new or different orifice disk may be inserted quickly and expeditiously. It is essential that the orifice in the disk or plate be exactly centered in the line. This structure insures such centering, as the cage and plate are self-centering.

What I claim is:

1. A meter orifice disk valve comprising a chambered body having a slot for insertion in said body and removal therefrom of an orifice cage, an orifice cage pivotally mounted on said body so as to be swung through said slot into position within said body or outside thereof, and means to lock said cage in said body.

2. A meter orifice disk valve comprising a chambered body having a slot for insertion in said body and removal therefrom of an orifice cage, an arm pivotally secured to said body at said slot, an orifice cage pivotally depending from said arm so as to be swung through said slot into position within said body or outside thereof, and means to lock said arm so as to hold said cage in said body.

In witness that I claim the foregoing I have hereunto subscribed my name this 14th day of December, 1925.

CLAY G. WOODMANSEE.